United States Patent
Porter et al.

(10) Patent No.: US 9,037,641 B1
(45) Date of Patent: *May 19, 2015

(54) DYNAMIC SERVICE-ORIENTED ARCHITECTURE USING CUSTOMIZATION CODE

(75) Inventors: Brandon W. Porter, Auburn, VA (US); Korwin J. Smith, Seattle, WA (US); Chris A. Suver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/571,490

(22) Filed: Aug. 10, 2012

Related U.S. Application Data (63) Continuation of application No. 12/289,195, filed on Oct. 22, 2008, now Pat. No. 8,255,490.

(51) Int. Cl.
*G06F 15/16* (2006.01)
*H04L 12/24* (2006.01)

(52) U.S. Cl.
CPC ........ *H04L 41/0681* (2013.01); *H04L 41/0816* (2013.01)

(58) Field of Classification Search
CPC ............... G06F 17/30867; H04L 41/0681; H04L 41/0816
See application file for complete search history.

(56) References Cited

U.S. PATENT DOCUMENTS

| | | | |
|---|---|---|---|
| 6,154,738 A | 11/2000 | Call | |
| 6,560,633 B1 | 5/2003 | Roberts et al. | |
| 7,376,959 B2 | 5/2008 | Warshavsky et al. | |
| 7,472,349 B1 | 12/2008 | Srivastava et al. | |
| 7,499,967 B2 | 3/2009 | Hulse et al. | |
| 7,568,038 B1* | 7/2009 | Ezerzer et al. | 709/227 |
| 7,580,946 B2* | 8/2009 | Mansour et al. | 1/1 |
| 7,602,721 B1* | 10/2009 | Tangirala et al. | 370/235.1 |
| 7,680,848 B2 | 3/2010 | Janedittakarn et al. | |
| 7,698,429 B1 | 4/2010 | Houlding et al. | |
| 7,720,800 B2* | 5/2010 | Fang et al. | 707/695 |
| 7,752,634 B1 | 7/2010 | Saxena et al. | |
| 7,996,850 B2 | 8/2011 | Massmann et al. | |
| 8,090,818 B2 | 1/2012 | Sindambiwe | |
| 8,146,099 B2* | 3/2012 | Tkatch et al. | 719/316 |
| 8,255,490 B1 | 8/2012 | Porter et al. | |
| 8,291,490 B1* | 10/2012 | Ahmed et al. | 726/17 |
| 2001/0052077 A1* | 12/2001 | Fung et al. | 713/184 |
| 2003/0009546 A1* | 1/2003 | Benfield et al. | 709/223 |
| 2003/0041238 A1* | 2/2003 | French et al. | 713/153 |

(Continued)

OTHER PUBLICATIONS

"UDDI Services,"http://www.microsoft.com/windowsserver2003/technologies/idm/uddi/default.mspx, retrieved Oct. 21, 2008 (2 pages).

(Continued)

*Primary Examiner* — Richard G Keehn
(74) *Attorney, Agent, or Firm* — Thomas | Horstemeyer, LLP (57) ABSTRACT

Systems and methods provide a dynamic multi-tenant service-oriented architecture using customization code. In one implementation, a computer-implemented method provides a service using customization code. A server receives a call to a service from a client. The call includes one or more parameters. The method determines, based at least in part upon the one or more parameters, a customization code segment that corresponds to the control point identifier. The method further calls the determined customization code segment inline during execution of the service.

20 Claims, 5 Drawing Sheets

(56) References Cited

U.S. PATENT DOCUMENTS

| | | | |
|---|---|---|---|
| 2006/0031432 A1* | 2/2006 | Patrick et al. | ............ 709/220 |
| 2007/0233871 A1 | 10/2007 | Fletcher et al. | |
| 2008/0082572 A1 | 4/2008 | Ballard et al. | |
| 2008/0256607 A1 | 10/2008 | Janedittakarn et al. | |
| 2008/0271059 A1 | 10/2008 | Ott et al. | |
| 2009/0049056 A1 | 2/2009 | Shutt et al. | |
| 2009/0089078 A1* | 4/2009 | Bursey | ............ 705/1 |

OTHER PUBLICATIONS

"What's New in Enterprise UDDI Services," published Jul. 24, 2002, updated Jul. 17, 2003, http://www.microsoft.com/windowsserver2003/evaluation/overview/dotnet/uddi.mspx, retrieved Oct. 21, 2008 (4 pages).

"Enterprise UDDI Services, downloadable white papers," published Feb. 21, 2003, http://www.microsoft.com/windowsserver2003/techinfo/overview/uddisynop.mspx, retrieved Oct. 21, 2008 (2 pages).

"Welcome to UDDI XML.org.," http/uddi.xml.org/, retrieved Oct. 21, 2008 (2 pages).

"UDDI Version 3 Features List," http://www.uddi.org/pubs/uddi_v3_features.htm, retrieved Oct. 21, 2008 (8 pages).

Rohit Aggarwal, et al., "Dynamic Web Service Composition in Meteor-S," LSDIA Lab, University of Georgia, Athens, available at http://lsdis.cs.uga.edu/lib/download/ieee-scc-2004.doc, 2009 (9 pages).

"Microsoft Biz Talk Server," http://www.microsoft.com/biztalk/en/us/default.aspx, retrieved Oct. 22, 2008 (2 pages).

* cited by examiner

| Entity, Configuration Version, and/or Site Version | |
|---|---|
| Control Point | Customization Code |
| CP1 | CC1 |
| CP2 | CC2 |
| CP3 | CC3 |
| CP4 | CC4 |
| CP5 | CC5 |
| CP6 | CC6 |

DYNAMIC SERVICE-ORIENTED ARCHITECTURE USING CUSTOMIZATION CODE

RELATED APPLICATION

This application is a continuation of U.S. patent application Ser. No. 12/289,195, filed Oct. 22, 2008. This application is related to U.S. application Ser. No. 12/289,211, filed Oct. 22, 2008. The disclosures of each of these applications are expressly incorporated herein by reference in their entirety.

BACKGROUND

1. Technical Field

The present disclosure generally relates to the field of computerized systems and methods. More particularly, the disclosure relates to computerized systems and methods that provide a dynamic service-oriented architecture using customization code.

2. Background Information

In software engineering, a service-oriented architecture (SOA) provides resources for performing particular functions as independent services that are accessible in a standardized way over a network. The services are considered standardized because distributed program components can invoke the services without any knowledge of an underlying platform that supports the services. The services can communicate and coordinate with one another to perform various activities for a variety of entities that are considered to be tenants of the SOA. For example, an entity that is operating as a retailer might use services that perform activities such as order processing, payment processing, and order fulfillment.

SOAs provides flexibility because heterogeneous components can be assembled into a functioning distributed system. However, due to the heterogeneity of the components and the lack of common extensibility mechanisms, SOAs tend to be single-purpose platforms that serve a single business entity. This kind of single-purpose architecture is contrary to the goals of a typical platform vendor, which might want to provide services to a large number of various entities that each have different business needs and goals. For example, a typical order fulfillment service, for example, may include various services, such as "Create Order," "Fulfill Order," "Ship Order," "Invoice Order," "Cancel/Update Order." Certain entities may wish to customize some aspect of one or more of these services due to a need to, for example, implement specific order processing rules, tax calculation rules, or other workflow steps.

Since a platform vendor may provide services to potentially hundreds of entities, it may be necessary to create customized services on a per entity per service basis. Consequently, the platform vendor may create a large number of services that essentially implement the same functionality, but variously include some customized feature. Moreover, since a service is a running instance of an object, a new service may need to be instantiated for each entity that requires a customized service. Instantiating a new service typically requires a new process, virtual machine, or host to execute the service. Increasing the number of objects in an SOA-based environment each time an entity requires a customized service creates operational complexity because more and more heterogeneity is introduced into the system and more system resources are consumed.

Typically, the primary mechanism for extending an SOA is to build new applications on top of underlying functionality. However, including customization and additional business logic at the application layer may cause performance, security, and manageability issues in an SOA environment where many entities make use of the services that are provided by the SOA. As result, a service owner may try to implement all of functionality that is required by the entities that use a particular service. However, this results in application-specific functionality being incorporated into the services themselves and increases the number of objects in the SOA environment that are required to deliver the functionality.

As is evident from the above, it is instead desirable to provide an extensible architecture in which services may be customized without altering existing program code or creating additional objects of the same service. However, customizing services for a particular entity without causing an increase in the number of objects is not feasible under a typical SOA. Accordingly, there is a need for improved systems and methods that provide an extensible SOA without causing the drawbacks discussed above.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, or adding steps to the disclosed methods. Accordingly, the following detailed description is not limiting of the disclosed embodiments. Instead, the proper scope is defined by the appended claims.

Disclosed embodiments provide computer-implemented systems and methods for providing a dynamic multi-tenant service-oriented architecture (SOA) using customization code. Customization code may comprise any segment or piece of program code that is executed as part of, or in addition to, a service. The systems and methods may enable an entity to incorporate customization code that is appropriate for that entity into particular services. For example, an entity that operates as a retailer may use payment, ordering, fulfillment, address, personalization, identification, and catalog services. For a variety of reasons, these generalized services may be called upon to support a wide-array of application-specific behaviors. For example, a retailer operating a distribution center in a particular jurisdiction may require certain tax calculations to be performed when processing an order being delivered to that jurisdiction. Another retailer may need to have different tax calculations performed for orders that are destined for a different jurisdiction. Although the above examples pertain to entities that operates as retailers, disclosed embodiments relate to any entity that uses services in a SOA.

Disclosed embodiments provide extensibility by adapting workflow and service-processing based on a current application context. For example, when a service receives a request, the request may also include information about the current application context. That service can then dynamically load any configuration, rules, and scripting that is associated with the application. The application-specific configuration data, configuration rules, and scripting may modify the service function at particular points in the service workflow and processing model. Points at which the service function may be modified are referred to as "control points" in the following discussion. A particular service may be able to handle transactions from many different applications and simultaneously minimize the operational burden of instantiating separate instances of the service. Furthermore, in disclosed systems and methods, the application-specific code and rules may be executed inline with the service. That is, a copy of the customization code may be substituted for the control point.

In disclosed embodiments, an entity in a multi-tenant SOA may specify customization code that an entity wishes to incorporate as part of a service. By multi-tenant, it is meant that a single instance of software running on a platform vendor's server can serve multiple client entities (i.e., the tenants). A platform vendor may encompass any entity providing services for other entities that may or may not be related to the platform vendor. For example, a platform vendor may provide services to a variety of retailers that are separate from the platform vendor or a platform vendor may provide services to other units or divisions that are operated by the platform vendor. By dynamic, it is meant that selection of appropriate customization code may occur during runtime (i.e., execution) of a service. For example, when a request is presented to a service, identifiers of an entity and a version of customization code may be passed along with the request. Based on the identifiers, the service may request the particular customization code to run for that request from a centralized store. The service may dynamically load the customization code (e.g., any configuration data, configuration rules, scripts, media resources, etc.) into its runtime environment. The service may executes its normal function and, where appropriate, call the customization code inline with the request.

An entity may specify the customization code that the entity wants to use with a mapping table. The mapping table may specify relationships between control points and customization code identifiers. Entities may have separate mapping tables for particular configuration versions (e.g., development environment, test environment, production environment, etc.) and/or site versions (e.g., a version 1 of a site, a version 1.2 of a site, etc.). Through the use of a mapping table, each entity may "plug in" their own customization code into a service while still running and operating as part of the platform vendor. This may be accomplished by each entity exposing the same SOA interface for the services that are provided by the platform vendor. Accordingly, the mapping table may provide a mapping between abstract interfaces and specific implementations and that mapping may occur dynamically.

Consistent with a disclosed embodiment, a computer-implemented method dynamically provides a service using customization code. According to the method, a server receives a call to a service from a client. The call may include one or more parameters. The method may identify a control point that is associated with the service and determine, based on the one or more parameters, a mapping table storing data. The data may identify one or more customization code segment. The method may further load the mapping table into a memory of the server and identify one of the customization code segments that corresponds to the control point. The method may further load the identified customization code segment into the memory of the server and call the identified customization code segment inline during an execution of the service. A response may be transmitted to the client, based on the execution.

Consistent with a disclosed embodiment, a computer-implemented method dynamically calls customization code during execution of a service. According to the method, a call to the service may be received from a client. The call may include one or more parameter. Based on the one or more parameters, the method may determine a mapping table storing data identifying one or more customization code segments. The method may further load the mapping table into a memory and determine, based on the mapping table, one of the customization code segments that is associated with a control point of the service. The method may further load the determined customization code segment into the memory and call the determined customization code segment inline when executing the service.

Consistent with a disclosed embodiment, a computer-implemented method dynamically executes a service. According to the method, a call to a service may be received from a client. The call may include an entity identifier. The method may load a mapping table corresponding to the entity identifier and determine, from the mapping table, a customization code segment that is associated with a control point of the service. The method may further execute the service and call the customization code segment inline during the execution.

Consistent with another disclosed embodiment, a system dynamically calls customization code during execution of a service. The system may comprise a server in communication with a network. The server may comprise a memory. The server may receive, from a client, a call to the service. The call may include one or more parameters. The server may further determine, based on the one or more parameters, a mapping table storing data identifying one or more customization code segments and load the mapping table into a memory. Based on the mapping table, the server may determine one of the customization code segments that is associated with a control point identifier. The control point identifier may be associated with the service. The server may further load the determined customization code segment into the memory and call the determined customization code segment inline when executing the service.

Consistent with other disclosed embodiments, a computer-readable storage medium may store program instructions for implementing any of the above-described methods.

It is to be understood that both the foregoing general description and the following detailed description are exemplary and explanatory only and are not restrictive of embodiments thereof, as claimed.

Figure 1:
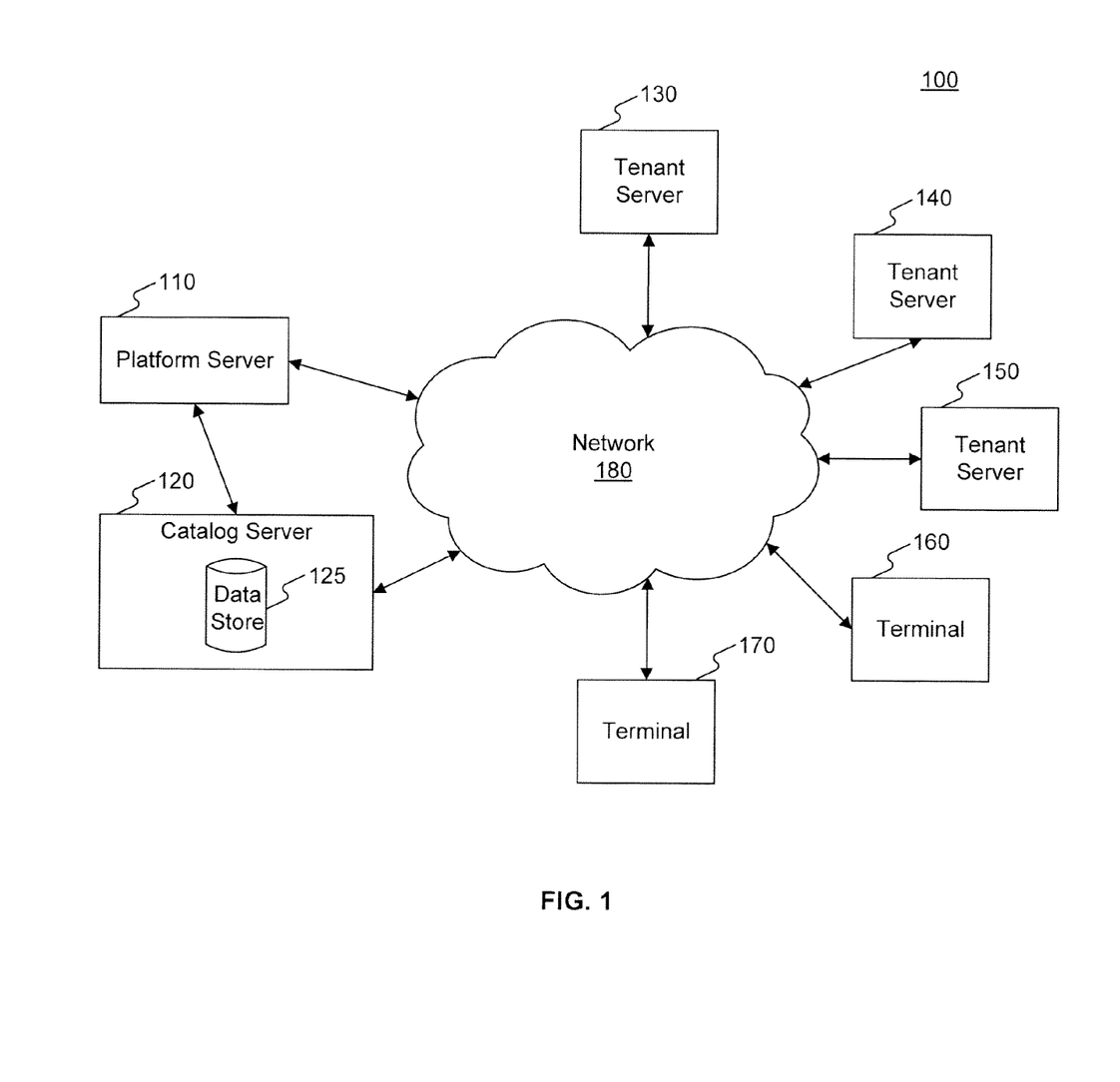
FIG. 1 is a diagram of an example of a system for providing a dynamic service-oriented architecture using customization code.

FIG. 1 is an example of a system 100 for providing a dynamic multi-tenant service-oriented architecture (SOA) using customization code, consistent with one or more disclosed embodiments. In particular, system 100 may provide functionality for dynamically loading customization code as part of a service request. As shown in system 100, platform server 110, catalog server 120, tenant servers 130-150, and terminals 160-170 are connected to a network 180. One of skill in the art will appreciate that although one platform server, one catalog server, three tenant servers, and two terminals are depicted in FIG. 1, any number of these components may be provided. One of ordinary skill in the art will also recognize that functions provided by one or more components of system 100 may be combined. For example, functionality provided by platform server 110 and catalog server 120 may be combined. Alternatively, in some implementations, catalog server 120 may be omitted.

Network 180 provides communications between the various components in system 100, such as platform server 110, catalog server 120, tenant servers 130-150, and terminals 160-170. In addition, platform server 110, catalog server 120, tenant servers 130-150, and terminals 160-170 may access legacy systems (not shown) via network 180, or may directly access legacy systems, data stores, or other network applications. Network 180 may be a shared, public, or private network, may encompass a wide area or local area, and may be implemented through any suitable combination of wired and/or wireless communication networks. Furthermore, network 180 may comprise an intranet or the Internet.

Platform server 110 may comprise a general purpose computer (e.g., a personal computer, network computer, server, or mainframe computer) having one or more processors (not shown in FIG. 1) that may be selectively activated or reconfigured by a computer program. Platform server 110 may be implemented in a distributed network. For example, platform server 110 may communicate via network 180 with one or more additional servers (not shown), which may enable platform server 110 to distribute processes for parallel execution by a plurality of other servers. Alternatively, platform server 110 may be specially constructed for carrying-out methods consistent with disclosed embodiments.

Platform server 110 may provide access to an Internet site, as well as provide functionality for authenticating users and transmitting data for various entities. For example, a retailer may operate platform server 110 to sell products and/or services. In one embodiment, platform server 110 may host a plurality of Internet sites for various entities. For example, platform server 110 may provide virtual storefronts to various entities, which may use services provided by platform server 110 to perform business-related activities. Other entities that may operate platform server 110 include content providers, social networking providers, media providers (e.g., audio and/or video programs), and any other kind of entities that may provide an Internet site. Additional details of platform server 110 are discussed below in connection with FIG. 2.

Catalog server 120 may comprise a general purpose computer (e.g., a personal computer, network computer, server, or mainframe computer) having one or more processors (not shown) that may be selectively activated or reconfigured by a computer program. Furthermore, catalog server 120 may communicate via network 180 or may be in direct bilateral communication with platform server 110. Catalog server 110 may also be implemented in a distributed network. For example, catalog server 110 may communicate via network 180 with one or more additional catalog servers (not shown) storing additional data.

Catalog server 120 may further include a data store 125. Data store 125 may store data describing items (e.g., products and/or services) offered for sale by one or more Internet sites provided by platform server 110. For example, data store 125 may store pages that are displayable by a computer executing software, such as an Internet browser. Furthermore, data store 125 may store item descriptions, prices, and media used in connection with the sale of the items. Media may include any images, photographs, sounds, and/or video clips that provide samples and/or information pertaining to the items. Products and/or services having information stored in data store 125 may be associated with a unique product identifier (ID). As discussed above, in implementations where platform server 110 does not provide services to retailers, catalog server 120 may be omitted or catalog server may instead store other data relevant to one or more entities providing Internet sites (e.g., social networking sites, news sites, media sites, etc.).

Tenant servers 130-150 may each comprise a general purpose computer (e.g., a personal computer, network computer, server, or mainframe computer) having one or more processors (not shown in FIG. 1) that may be selectively activated or reconfigured by a computer program. Tenant servers 130-150 may communicate via network 180 with platform server 110 and/or catalog server 120. For example, a retailer selling products may operate tenant server 130, a content provider providing news information may operate tenant server 140, and a media provider of video content may operate tenant server 150. Tenant server 130 may provide product information to platform server 110, which in turn may be stored in catalog server 120. Alternatively, tenant server 130 may maintain product information locally. Furthermore, tenant server 140 and tenant server 150 may locally store news content and video content, respectively, or may store such content in platform server 110 and/or catalog server 120. Although the foregoing exemplary entities are discussed in connection with tenant servers 130-150, tenant servers 130-150 may be operated by an appropriate entity, as discussed above.

Terminals 160-170 may be any type device for communicating with platform server 110, catalog server 120, and/or tenant servers 130-150 over network 180. For example, terminals 160-170 may be personal computers, handheld devices (e.g., PDAs, cellular phones, etc.), or any other appropriate computing platform or device capable of exchanging data with network 180. Terminals 160-170 may each include, for example, a processor and a memory (not shown). Furthermore, terminals 160-170 may execute program modules that provide one or more graphical user interfaces (GUIs) for interacting with network resources, such as platform server 110, catalog server 120, and/or tenant servers 130-150.

Although users of terminals 160-170 may access and/or receive data from platform server 110, catalog server 120, and/or tenant servers 130-150, in a preferred embodiment, users at terminals 160-170 may access and/or receive data directly from platform server 110. For example, in one embodiment, platform server 110 may provide and host operations of the entities operating tenant servers 130-150. That is, in the example of a retailer operating tenant server 110, platform server 110 may retrieve appropriate data from catalog server 120 and serve such data to users at terminals 160-170. As the term is used herein, "users" may include individuals visiting one or more entities having a virtual store and/or presence that is provided by platform server 110. Furthermore, "users" may include individuals having electronic accounts, such as accounts storing data in electronic form (e.g., files), financial accounts, social networking accounts, and the like. In an alternative implementation, platform server 110 may provide data to users at terminals 160-170 from platform server 110 and/or one or more of tenant servers 130-150.

Users may access platform server 110 and/or tenant servers 130-150 over network 180 through an Internet browser or a software application running on any one of terminals 160-170. For example, platform server 110 may transmit a document (e.g., a web page) that is accessible by an Internet browser executing on one of terminals 160-170. The document may include options for a user to log onto one or more secure sites provided by platform server 110. Users may log onto one or more secure sites provided by platform server 110, for example, by supplying credentials, such as a username (e.g., email address) and a password. Because the Internet sites may use a secure communication environment, such as an HTTPS (hypertext transfer protocol secure) environment to transfer data over network 180, data transfer is assumed to be secure.

Figure 2:
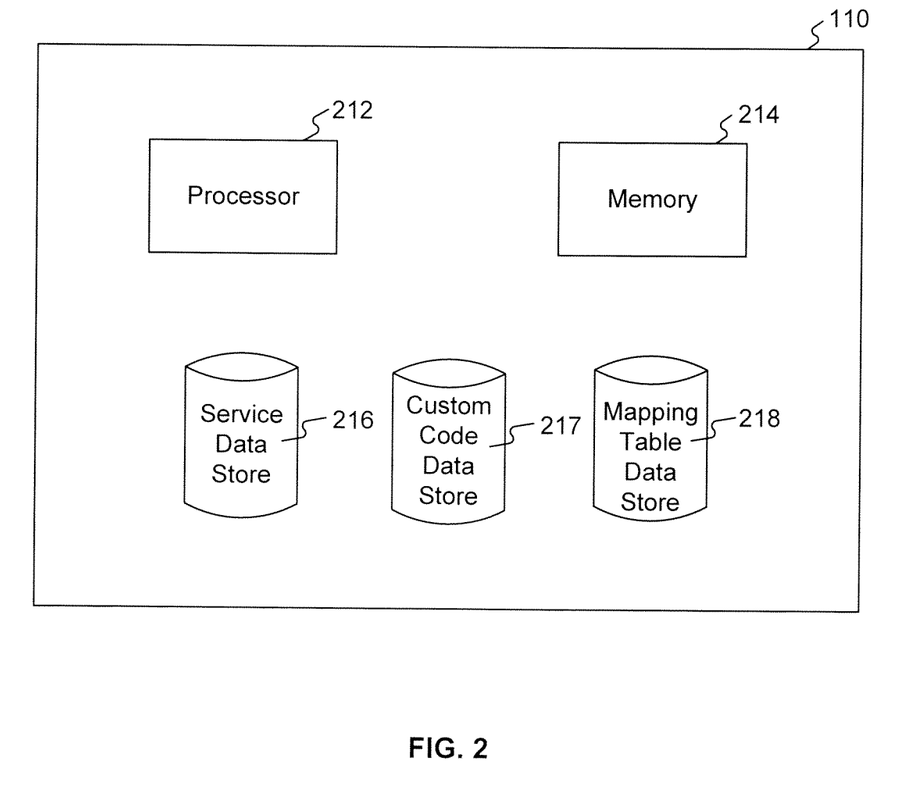
FIG. 2 is diagram of an example of an architecture of a platform server.

FIG. 2 shows a diagram of an example of an architecture of platform server 110, in accordance with one or more embodiments. Platform server 210 may include a processor 212 and a memory 214. Memory 214 may be one or more memory or storage devices that store data as well as software. Memory 214 may also comprise, for example, one or more of RAM, ROM, magnetic storage, or optical storage. Furthermore, memory 214 may store program modules that, when executed by processor 212, perform one or more processes for operating one or more Internet sites.

Platform server 110 may further include a service data store 116, a custom code data store 117, and a mapping table data store 218. Service data store 216 may store program modules for various services provided by platform server 110. For example, platform server 110 may host sites for a plurality of entities by providing services that perform activities, such as providing a virtual store for a retailer. For example, the retailer may use payment, ordering, fulfillment, address, personalization, identification, and catalog services that are stored in service data store 216.

Custom code data store 117 may store customization code (e.g., configuration data, configuration rules, scripts, media resources, etc.) that may be incorporated into one or more services that are stored in service data store 216. Although service data store 116 and custom code data store 117 are separately shown in FIG. 2, one of ordinary skill will recognize that the data stores may be combined.

Mapping table data store 218 may store mapping tables for entities using services that are provided by platform server 110. An entity may specify customization code that the entity wants to use through the use of a mapping table. Each entity may correspond to one or more mapping tables maintained by mapping table data store 218. For example, entities may have separate mapping tables for particular configuration versions (e.g., development environment, test environment, production environment, etc.) and/or for particular site versions (e.g., a version 1 of a site, a version 1.2 of a site. etc.). Furthermore, the mapping tables may specify a relationship between control points and customization code. As discussed above, the customization code (e.g., configuration data, configuration rules, scripting, media resources) may modify a service function at control points. Mapping tables are discussed in further detail in connection with FIG. 3.

Although not shown in FIG. 2, platform server 110 may include additional data stores, such as, for example, a username and password data store, a user profile data store, a user transaction history data store, a preference data store, etc. For example, the username and password data store may store username and password combinations for users of one or more Internet sites provided by platform server 110. The user profile data store may store information pertaining to users, such as name, billing address, shipping address, payment information (e.g., credit card, debit card, account numbers, etc.), age, occupation, etc. The user transaction history data store may store transaction histories of users relating to transactions. Transactions may include any activities participated in by users and/or provided by an Internet site, such as, for example, game histories, email histories, auction histories, download histories, search histories, and/or purchase histories. For example, a purchase history may include information about orders including completed orders (e.g., orders for products and/or services that have been shipped or provided), open orders (e.g., orders for products and/or services that have been placed, but have not been shipped or provided), past items that have been viewed and/or added to a shopping cart, and/or search results. The preference data store may include ratings information for any items or topics, including ratings of items previously purchased or owned by a user, or ratings of any topic of interest (e.g., news, sports, entertainment, products, etc.) to a user.

Figure 3:
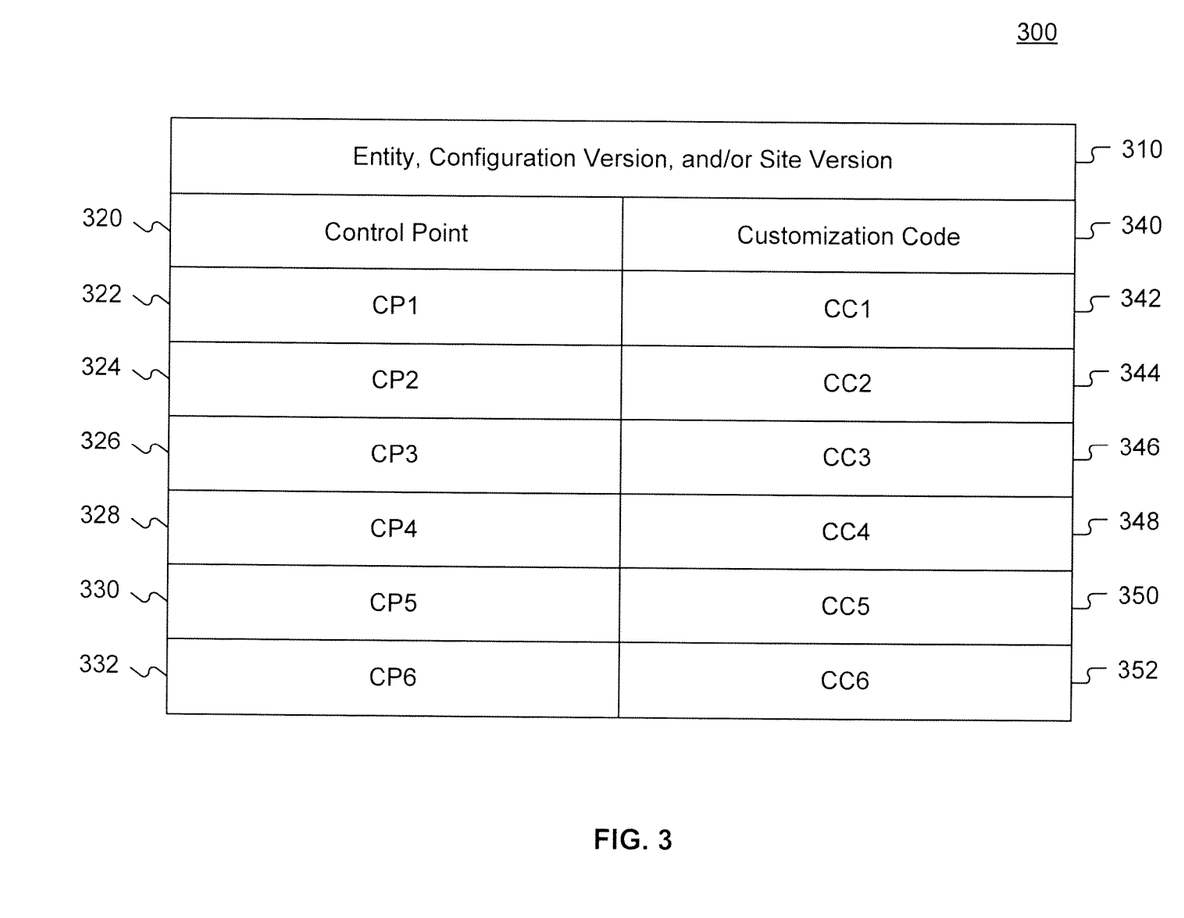
FIG. 3 is an example of a mapping table for selecting customization code.

FIG. 3 is an example of a mapping table 300, consistent with one or more disclosed embodiments. As discussed above, mapping table 300 may be stored, for example, in platform server 110. Mapping table 300 may store data pertaining to any entity that uses services provided by platform server 110. Mapping table 300 may constitute a file or a vtable.

Mapping table 300 may include a header 310, control point fields 320-332, and customization code fields 340-352. Header 310 may provide an identifier of an entity and an identifier of a configuration version and/or a site version. The identifier of the entity may comprise any alphanumeric data that may uniquely identify the entity. Similarly, the identifier of the configuration version may comprise any alphanumeric data that may uniquely identify the configuration version and the identifier of the site version may comprise any alphanumeric data that may uniquely identify the site version.

Entities that use services provided by platform server 110 may have separate mapping tables for particular configuration versions (e.g., development environment, test environment, production environment, etc.). For example, an entity may wish to use certain instances of services for a test environment and while other instances of services are used for a production environment. Similarly, an entity may wish to use certain instances of services for an older site version and different instances of services for a newer site version.

Control point fields 320-332 and customization code fields 342-352 may specify a relationship between control points and customization code. As discussed above, a "control point" may constitute a point at which a service function may be modified. Customization code may comprise any segment or piece of program code that is executed as part of, or in addition to, a service. Customization code may further replace a control point. For example, as shown in mapping table 300, control point fields 322-324 include identifiers of six control points (i.e., CP1, CP2, etc.). As further shown in mapping table 300, customization code fields 342-352 include identifiers of six different segments or pieces of customization code (i.e., CC1, CC2, etc.) that are specified by a particular entity. The identifiers may constitute pointers to the customization code.

Although mapping table 300 is described as being stored by platform server 110, in other embodiments, mapping table 300 may be stored in tenant servers 130-150. For example, platform server 110 may retrieve mapping table 300 from storage (not shown) of tenant server 130 in order to determine appropriate customization code for use with a particular service. Furthermore, administrators of tenant servers 130-150 may configure mapping tables that are stored locally (i.e., at tenant servers 130-150) or may configure mapping tables that are stored by platform server 110 via configuration software provided at tenant servers 130-150. Still further, an administrator of a site provided by an entity may configure a mapping table that is stored by platform server 110 or one of tenant servers 130-150 using one of terminals 160-170.

Figure 4:
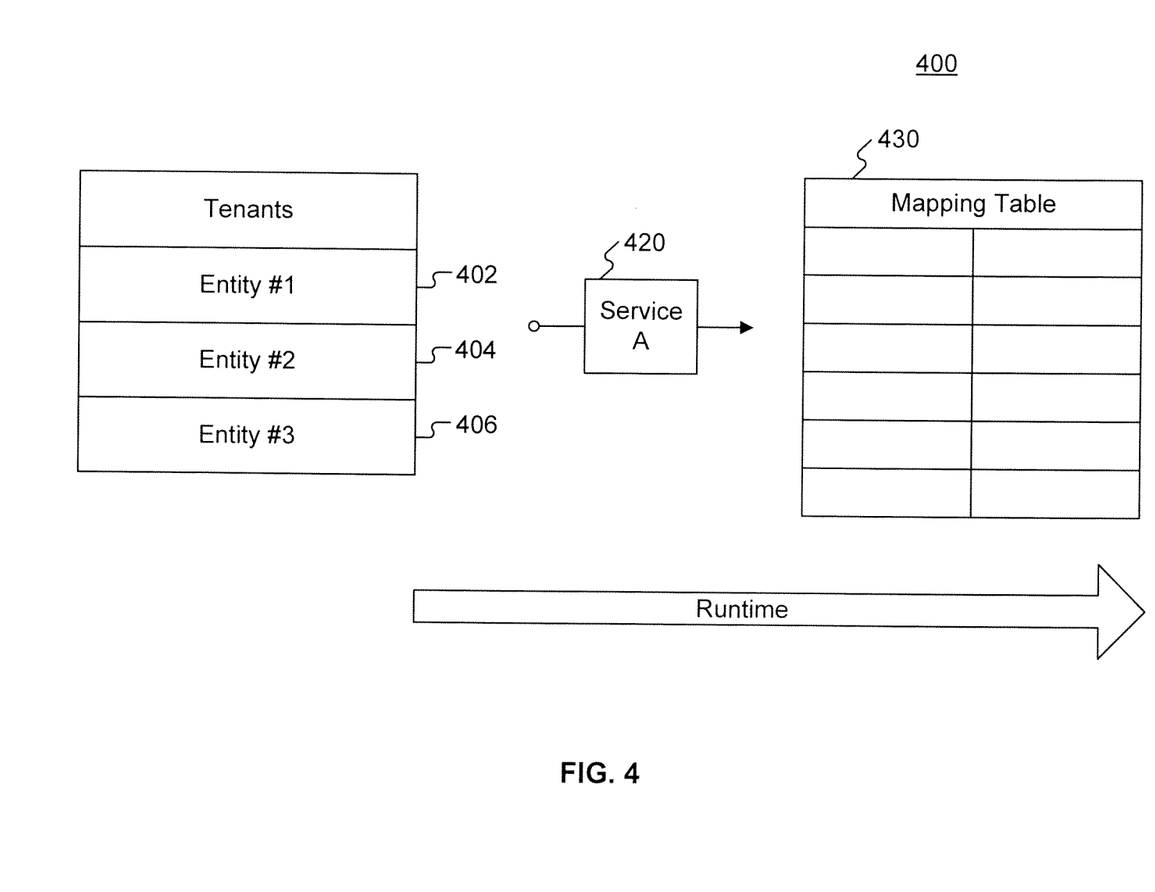
FIG. 4 is a conceptual diagram of an example of dynamically executing customization code in a multi-tenant service-oriented architecture.

FIG. 4 is a conceptual diagram of an example of dynamically executing customization code for a service in a multi-tenant SOA, in accordance with one or more disclosed embodiments. As shown in FIG. 4, three entities (i.e., entity 402, entity 404, and entity 406) are depicted that use services provided by platform server 110. Each of entities 402-406 may correspond to a site, such as a virtual storefront, that is provided by platform server 110. Furthermore, any one of entities 402-406 may have platform server 110 execute one or more services on its behalf. Although three entities are shown in FIG. 4, one of ordinary skill in the art will recognize that any appropriate number of entities may have sites that are provided by platform server 110. Moreover, a single entity may have multiple sites that are hosted by platform server 110.

For example, a user at a client (e.g. one of terminals 160-170) may visit a site of entity 402. The user may subsequently take an action that causes platform server 110 to receive a call to service 420 (i.e., "Service A") or platform server 110 may receive a call to service 520 without user intervention. A user action may be, for example, selecting a link to place an order. As a result of that action, platform server 110 may receive data (e.g., a uniform resource locator (URL)) from the terminal. The received data may include a service identifier and one or more parameters, such as an identifier of the entity (e.g., the site), a configuration version, and/or a version of the site.

Platform server 110 may next determine whether service 420 includes one or more control points. If service 420 does not include one or more control points, platform server 110 may simply execute the requested service. However, if service 420 includes one or more control points, platform server 110 may load a mapping table 430 based on the received data.

Platform server 110 may use the received data to determine a mapping table based on one or more of the parameters included in the received data. For example, platform server 110 may identify a mapping table based on an identifier of entity 402. In addition, platform server 110 may use other parameters, such as an identifier of a configuration version and/or an identifier of a version of the site of entity 402 to determine the mapping table. For example, as shown in FIG. 4, platform server 110 has identified mapping table 430 as appropriate for entity 402 and any other received parameters. Platform server 110 may load mapping table 430 into memory 214. Furthermore, platform server 110 may determine appropriate customization code to call inline with Service A based on the mapping table 430.

Figure 5:
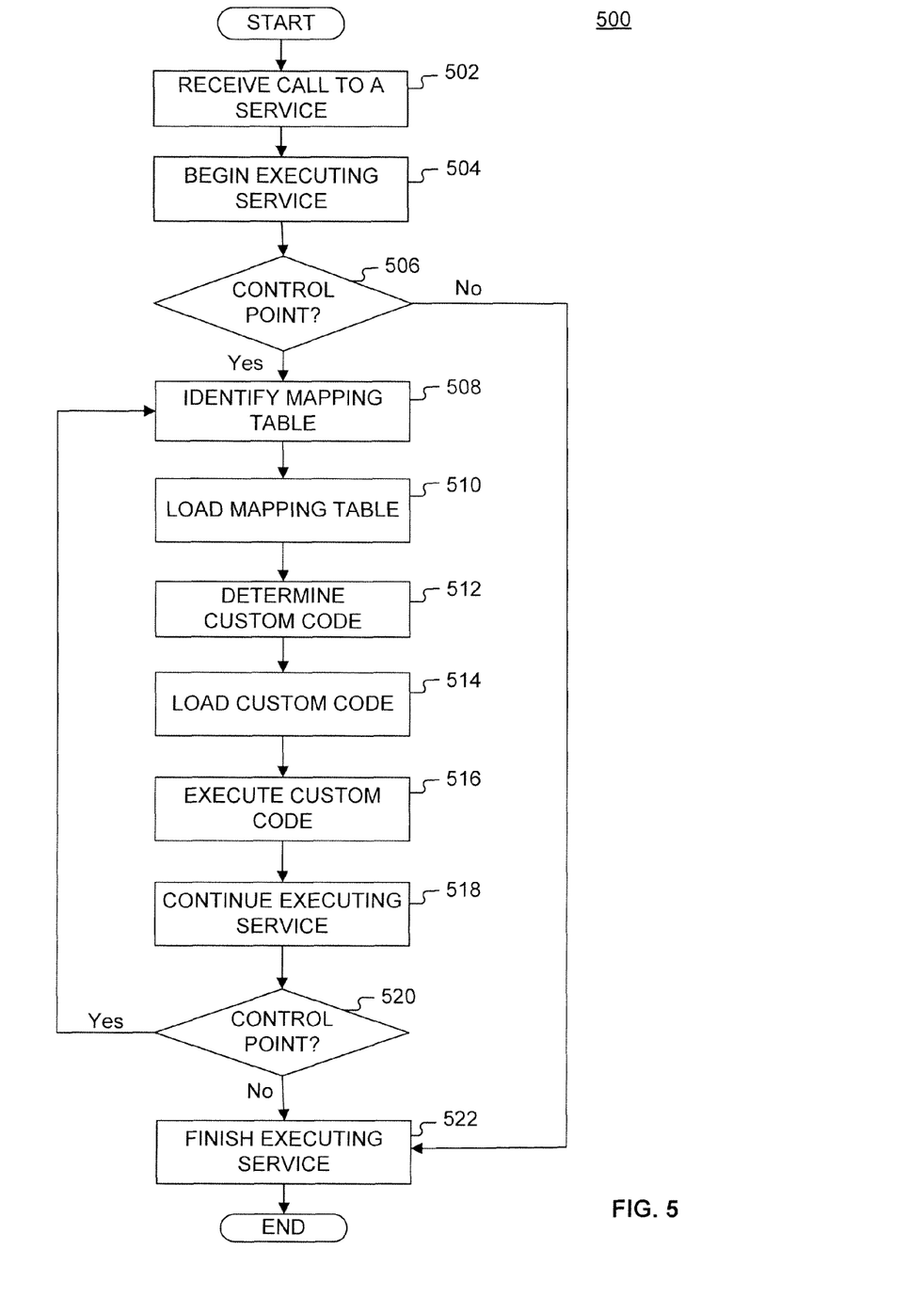
FIG. 5 is a flow diagram of an example of a routine for dynamically executing customization code in a multi-tenant service-oriented architecture.

FIG. 5 is a flow diagram of an example of a routine 500 for dynamically executing customization code in a multi-tenant SOA, consistent with one or more disclosed embodiments. Routine 500 may implement processes according to one or more of program modules stored in memory 214.

At the start of routine 500, in block 502, platform server 110 may receive a call to a service from a client. For example, a user at one of terminals 160-170 may visit a site of an entity. The entity may be considered to be a tenant that is part of a multi-tenant architecture in which the tenants are able to access one or more services that are provided by platform server 110. A service being executed at one of terminals 160-170 may call another service, either automatically or due to an action taken by a user at one of terminals 160-170. For example, the call to the service may be included as part of a uniform resource locator (URL) that platform server 110 receives over network 180 from the terminal. The call may include a service identifier and one or more parameters, such as an identifier of the entity (e.g., the site), configuration version, and/or a version of the site.

Next, in block 504, platform server 110 may begin to execute the service. In block 506, platform server 110 may determine whether the service includes one or more control points. For example, the service identifier may include data specifying that the service includes one or more control points. The data may include identifiers that correspond to the control points. If the service includes one or more control points, then the routine proceeds to block 508. If the service does not include one or more control points, then the routines proceeds to block 522. In block 522, the requested service completes execution and the routine ends.

If the service includes one or more control points, in block 508, platform server 110 may identify a mapping table. As discussed above, platform server 110 may store mapping tables in a mapping table data store 218. Alternatively, in another embodiment, platform server 110 may refer to a data store (not shown) of one of tenant servers 130-150, which may store one or more mapping tables.

Identification of a mapping table may be based upon one or more parameters included in the data received with the call to the service in block 502. For example, platform server 110 may identify the mapping using an entity identifier. In another embodiment, platform server may identify the mapping table using the entity identifier and a configuration version (e.g., development environment, test environment, production environment, etc.) and/or a site version (e.g., a version 1 of a site, a version 1.2 of a site. etc.).

In block 510, platform server 110 may load the identified mapping table. For example, platform server 110 may load the identified mapping table into memory 214. In another embodiment, the identified mapping table may be loaded into memory (not shown) of one of tenant servers 130-150.

Next, in block 512, platform server 110 may use a control point identifier to determine a customization code segment using the loaded mapping table. For example, in mapping table 300, as shown in FIG. 3, control point #3 ("CP3") corresponds to customization code #3 ("CC3"). Accordingly, if the received data in block 520 includes "CP3," then in step 550, platform server 110 selects "CC3." Furthermore, if more than one control points are included in the service, platform server may similarly select the other appropriate customization code segments based on mapping table 300.

In block 514, platform server 110 may load the customization code into its runtime environment. For example, platform server 110 may load one or more customization code segments into memory 214.

Next, in block 516, platform server 110 may execute the custom code. For example, during execution of the service, when execution of the service reaches a control point, platform server 110 may call an appropriate customization code segment inline from memory 214. In block, 518, platform server 110 may continue execution of the service.

The customization code segment and/or the service may include additional control points. Accordingly, in decision block 520, platform server 110 may determine whether there is an additional control point. If there is another control point, then the routine may return to block 508. If there is not another control point, then the routine proceeds to block 522 and platform server 110 may finish execution of the service.

For example, when a payments service is called by a client, platform server 110 may select a customization code segment based on the received parameters and the mapping table. The customization code may cause the payment to be processed with a particular vendor. The remainder of the functionality for processing the payment may be provided by the service.

For example, the payment service may process a payment with the payment vendor over network 180 and platform server 110 may send, for example, a payment confirmation to the client. The payment confirmation may be displayed on a screen included in, connected to, or in communication with the client (e.g., one of terminals 160-170).

As discussed above, a service can independently perform functionality to call customization code and, accordingly, a single service-oriented-architecture can support many different business entities simultaneously without the addition of new layers of complexity into the SOA for each new business-entity. Furthermore, as discussed above in connection with decision block 520, customization code and/or a service may include multiple control points. During execution, appropriate customization code segments corresponding to each control point may be executed inline with the service. For example, control points may be nested as customization code itself may include one or more additional control points. Accordingly, during the execution of customization code, any control points that are nested may also cause platform service 110 to execute appropriate customization code segments.

As one of ordinary skill in the art will appreciate, one or more of blocks 502-522 may be optional and may be omitted from implementations in certain embodiments. Furthermore, in some implementations, blocks 502-522 may be reordered, include substitute steps, and/or include additional steps. Moreover, while the above discussion refers to platform server 110 as performing one or more of blocks 502-522, one of ordinary skill in the art will appreciate that other components of system 110 (e.g., tenant servers 130-150) may perform one or more of blocks 502-522.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A non-transitory computer-readable medium comprising:
    code that receives a request for a service from a client, the request including one or more parameters;
    code that identifies, as a control point associated with the service, a point within the service at which the client is permitted to modify the service;
    code that identifies, based at least in part upon the one or more parameters, a customization code segment that corresponds to the control point;
    code that loads the customization code segment into a memory of a server;
    code that calls the customization code segment inline during an execution of the service by:
        executing the service until the control point is reached; and
        calling and executing the customization code segment inline in response to the execution of the service reaching the control point; and
    code that transmits a response to the client based at least in part upon the inline call during the execution of the service.

2. The non-transitory computer-readable medium of claim 1, wherein the code that calls the customization code segment calls the customization code segment in response to the execution of the service reaching the control point.

3. The non-transitory computer-readable medium of claim 1, wherein the request from the client comprises a uniform resource identifier including a service identifier and the one or more parameters.

4. The non-transitory computer-readable medium of claim 1, wherein:
    the one or more parameters comprise an identifier of an entity for which the server is hosting the service; and
    the code that identifies the control point identifies the control point based in part on the entity.

5. The non-transitory computer-readable medium of claim 1, wherein the one or more parameters comprise at least one of a configuration or site version of a site hosted by the server.

6. A computer-implemented method for dynamically calling customization code during execution of a service, comprising:
    receiving, at a computing device and from a client, a call to the service, the call including one or more parameters;
    identifying, as a control point associated with the service, a point within the service at which the client is permitted to modify the service;
    determining, based at least in part upon the one or more parameters, a customization code segment that is associated with the control point;
    calling, by the computing device, the customization code segment inline when executing the service by:
        executing the service until the control point is reached; and calling and executing the customization code segment inline in response to the execution of the service reaching the control point.

7. The computer-implemented method of claim 6, wherein calling the customization code segment inline is performed in response to the execution of the service reaching the control point.

8. The computer-implemented method of claim 6, further comprising determining, based at least in part upon the one or more parameters, a mapping table that is stored in a data store associated with the computing device and that identifies one or more customization code segments.

9. The computer-implemented method of claim 8, wherein the mapping table stores a control point identifier that corresponds to the control point.

10. The computer-implemented method of claim 8, wherein the call to the service is made for a tenant that is part of a multi-tenant architecture.

11. A computer-implemented method for dynamically executing a service, comprising:
   receiving, at a computing device and from a client, a call to a service, the call including an entity identifier;
   identifying, as a control point associated with the service, a point within the service at which the client is permitted to modify the service based at least in part upon an entity identifier;
   determining a customization code segment that is associated with the control point based at least in part upon the entity identifier;
   executing the service;
   calling, by the computing device, the customization code segment inline during the execution of the service by:
      executing the service until the control point is reached; and
      calling and executing the customization code segment inline in response to the execution of the service reaching the control point.

12. The computer-implemented method of claim 11, wherein calling the customization code segment inline is performed in response to the execution of the service reaching the control point.

13. The computer-implemented method of claim 11, wherein:
   the call from the client comprises a uniform resource indicator including the entity identifier; and
   identifying the control point comprises identifying the control point based in part on the entity identifier.

14. The computer-implemented method of claim 11, wherein the customization code segment comprises one or more of configuration data, configuration rules, scripts, or media resources.

15. The computer-implemented method of claim 11, further comprising:
   loading a mapping table that corresponds to the entity identifier; and
   determining the customization code segment from the mapping table.

16. A system for dynamically calling customization code during execution of a service, the system comprising:
   at least one computing device; and
   an application executable in the at least one computing device, the application being configured to cause the at least one computing device to:
      receive, from a client, a call to the service, the call including one or more parameters;
      identify, as a control point associated with the service, a point within the service at which the client is permitted to modify the service based at least in part upon the one or more parameters;
      determine a customization code segment that is associated with the control point based at least in part upon the one or more parameters;
      call the customization code segment inline when executing the service by:
         executing the service until the control point is reached; and
         calling and executing the customization code segment inline in response to the execution of the service reaching the control point.

17. The system of claim 16, wherein the application is configured to cause the at least one computing device to call the customization code segment inline in response to the execution of the service reaching the control point.

18. The system of claim 16, wherein:
   the one or more parameters comprise a uniform resource indicator including an entity identifier; and
   identifying the control point comprises identifying the control point based in part on the entity identifier.

19. The system of claim 16, further comprising:
   loading a mapping table that corresponds to the entity identifier; and
   determining the customization code segment from the mapping table.

20. The system of claim 16, wherein the customization code segment comprises one or more of configuration data, configuration rules, scripts, or media resources.

* * * * *